United States Patent
Schuler

[11] 3,902,086
[45] Aug. 26, 1975

[54] COMPOSITE MACHINE FOR SUPPLYING SPEED AND CONTROL SIGNALS TO A SPEED CONTROLLABLE CONVERTER MACHINE ASSEMBLY

[75] Inventor: Ulrich Schüler, Berlin, Germany

[73] Assignee: Siemens Aktiengesellschaft, Munich, Germany

[22] Filed: Mar. 7, 1974

[21] Appl. No.: 449,005

[30] Foreign Application Priority Data
Mar. 8, 1973   Germany.......................... 2311954

[52] U.S. Cl............................ 310/112; 310/168
[51] Int. Cl. .......................................... H02k 19/34
[58] Field of Search ...... 322/90; 310/168, 198, 183, 310/197, 112, 169, 170, 126

[56] References Cited
UNITED STATES PATENTS

| | | | |
|---|---|---|---|
| 2,054,678 | 9/1936 | Merrill | 310/112 X |
| 2,705,303 | 3/1955 | Stinger | 310/112 X |
| 3,264,504 | 8/1966 | Lamorlette | 310/197 X |
| 3,452,229 | 6/1969 | Pimlott et al. | 310/168 |
| 3,512,026 | 5/1970 | Tiltins | 310/168 |
| 3,671,851 | 6/1972 | Harkness | 322/90 |
| 3,714,480 | 1/1973 | Apsit et al. | 310/170 |

*Primary Examiner*—Donovan F. Duggan
*Attorney, Agent, or Firm*—Kenyon & Kenyon Reilly Carr & Chapin

[57] ABSTRACT

A composite machine supplies speed and control signals to a speed controllable converter machine assembly equipped with thyristors. The composite machine includes a slotted stator subdivided into at least two sections along its circumference. An inductive pulse generator is provided having primary and secondary windings arranged in one of the sections and a tachometer generator is provided with excitation and alternating-current windings arranged in the other one of the sections. A damper winding is arranged intermediate the two sections to electrically separate the same. A toothed rotor is mounted to rotate in the stator to coact with the windings of the pulse generator and with the windings of the tachometer generator.

5 Claims, 3 Drawing Figures

COMPOSITE MACHINE FOR SUPPLYING SPEED AND CONTROL SIGNALS TO A SPEED CONTROLLABLE CONVERTER MACHINE ASSEMBLY

BACKGROUND OF THE INVENTION

Speed-controlled converter machines are fed from an alternating-current system through a rectifier and an inverter with a direct-current intermediate circuit, the elements of which are formed by thyristors. The individual phases of the stator winding of the converter machine are fed as a function of the rotor position, the thyristors performing the on and off switching. The rotor position-dependent firing pulses for the thyristors required therefor are generally generated by a pulse generator having a rotor which is connected with the rotor shaft of the machine.

It is particularly advantageous to generate the output voltages for the pulses through a transformer so that independence of the circumferential velocity at low speeds is achieved. Such an inductive pulse generator for the control signals of the thyristors can advantageously consist of a rotating toothed rotor without windings and a stator with slots, whose teeth carry primary and secondary windings, the toothed rotor being arranged on the rotor shaft of the converter machine.

In addition, however, an indication of the actual speed value is needed for the speed control in a converter machine. This value is furnished by a tachometer generator which is also connected to the rotor shaft of the converter machine. A speed-controlled converter machine requires an inductive pulse generator as well as a tachometer generator for its operation and space must be provided to accommodate this equipment.

SUMMARY OF THE INVENTION

It is an object of the invention to provide a composite machine suitable for supplying speed and control signals to a speed controllable converter machine assembly. It is another object to reduce the space required for accommodating the pulse generator for supplying the control signals and the tachometer generator for providing the indication of converter rotational speed as well as for reducing the construction required to build these generators.

To achieve these objects, the pulse generator and the tachometer generator are combined, according to the invention, in a composite machine with a common toothed rotor. The stator of the composite machine is divided along its circumference into sections wherein either the primary and secondary windings of the pulse generator or the excitation and alternating-current windings of the tachometer are located. The damper windings are arranged between the sections.

The composite machine, according to the invention, is suitable for supplying speed and control signals to a speed-controllable converter machine assembly equipped with thyristors. The composite machine includes as a feature a slotted stator subdivided into at least two sections along its circumference. An inductive pulse generator having primary and secondary windings is arranged in one of the sections and tachometer means with excitation winding means and an alternating-current winding means is disposed in the other one of the sections. A toothed rotor is connected to the shaft of the converter machine and is mounted so as to be rotatable in the stator to coact with the windings of the pulse generator to generate control signals for the thyristors and to coact with the winding means of the tachometer means to provide an electrical quantity indicative of the rotational speed of the machine. A damper winding is mounted between the stator sections as mentioned above.

Thus, a single machine fulfills both the objectives of reduced space and construction thereby realizing a substantial saving of parts as well as of structural length along the axis. With the damper windings arranged between the individual sections of the stator, a clear separation of the stator sections electically and also, in part, magnetically is achieved so that the different excitations (alternating-current in the case of the pulse generator and direct-current in the case of the tachometer generator) do not influence each other.

Since eccentricity of the rotor can occur because of manufacturing inaccuracies and would thus falsify the tachometer voltage used for the speed indication, it is advisable to subdivide the stator into four approximately equal sections and to provide mutually opposite lying sections with the same windings. These can, for instance, be connected in series and thereby equalize rotor eccentricity, so that no voltage variations of the tachometer machine can result therefrom.

Although the invention is illustrated and described herein as a composite machine for supplying speed and control singals to a speed controllable converter machine assembly, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
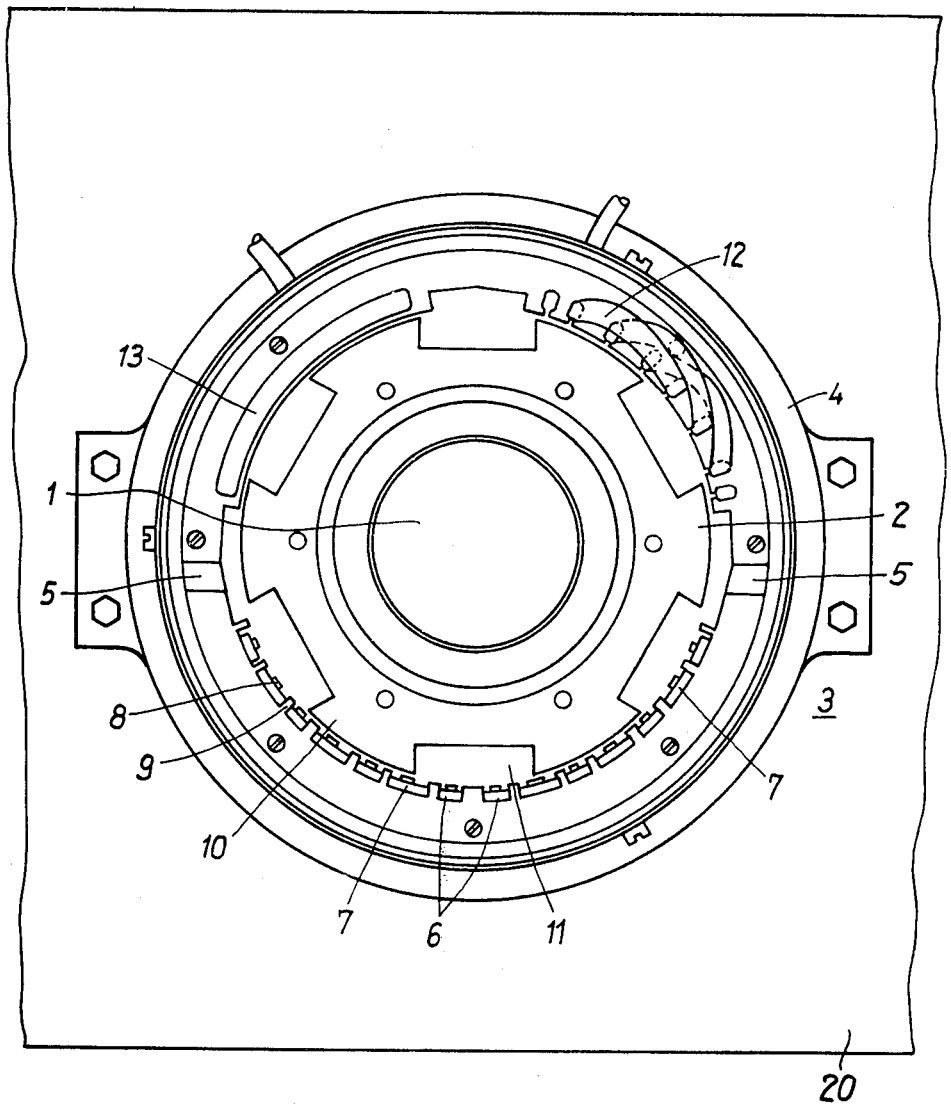
FIG. 1 is a schematic diagram showing the composite machine arrangement according to a preferred embodiment of the invention wherein the stator is apportioned into two sections for accommodating the pulse generator and tachometer respectively.
Figure 3:
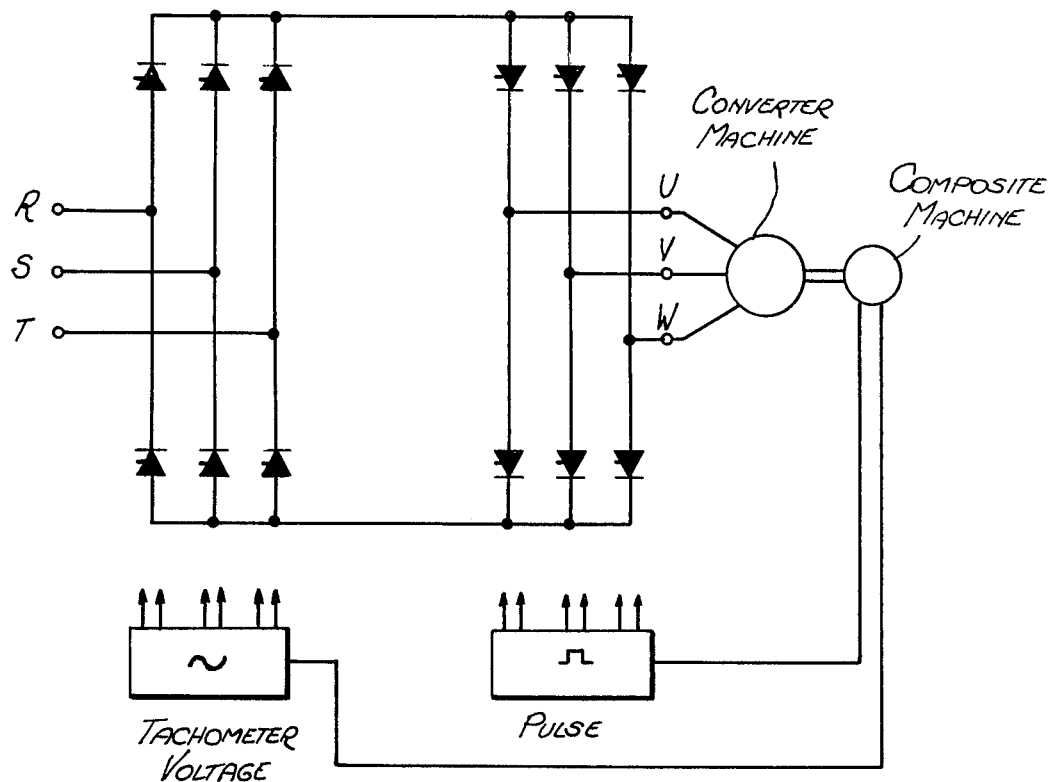
FIG. 3 is a schematic block diagram showing a speed-controllable converter machine assembly equipped with thyristors supplied by control signals from the composite machine according to the invention.

The toothed rotor 2 of the composite machine 3 of FIG. 1 is without windings and is mounted on the rotor shaft 1 of the converter machine. The composite machine includes the pulse generator and the tachometer generator and can supply control signals to a speed-controllable converter machine assembly equipped with thyristors as shown in FIG. 3.

Referring again to FIG. 1, the rotor 2 is enclosed by the stator 4 which is advantageously mounted in a simple manner at the stationary part 20 of the converter machine. A separate support for the stator 4 of the composite machine 3 thereby becomes unnecessary.

The slotted stator 4 is divided along its circumference into two sections each taking up approximately half of the circumference. Damper winding means in the form of the damper winding 5 is aranged between the two sections. The one section contains the primary windings 6 and the secondary windings 7 of an inductive pulse generator; these windings are in each case arranged on teeth 8 in such a manner that a tooth 9 without windings is always interposed between them. The primary windings 6 are supplied with high-frequency alternating-current to generate the rotor position-dependent pulses. A voltage is thereby induced in the secondary windings 7 which varies between a minimum and a maximum value depending upon whether a rotor tooth 10 or a pole gap 11 is situated under the coils. This modulated alternating-current voltage therefore indicates the position of the rotor 2 relative to the axis of the secondary winding 7. For generating a pulse, two secondary-winding voltages which are electrically displaced by 180° with respect to each other, relative and modulated alternating-current voltage, are rectified, added together to form a trapezoidal curve with a steep zero crossing and are transformed into rectangular pulses in an amplifier. Because three pulses displaced 120 electrical degrees are needed for the control of the converter machine, correspondingly many primary windings 6 and secondary windings 7 are provided.

On the other section of the stator 4 are arranged two separate alternating-current windings 12 and two excitation windings 13 fed with direct-current. By the rotation action of the rotor 2, magnetized by the excitation windings 13, a tachometer voltage is generated in the alternating-current windings 12. The tachometer voltage is a measure for the speed of rotation of the rotor 2. The damper winding 5 interposed between the two sections of the stator 4 suppresses any influence of the high-frequency excitation in the section of the inductive pulse generator on the section of the tachometer generator.

Figure 2:
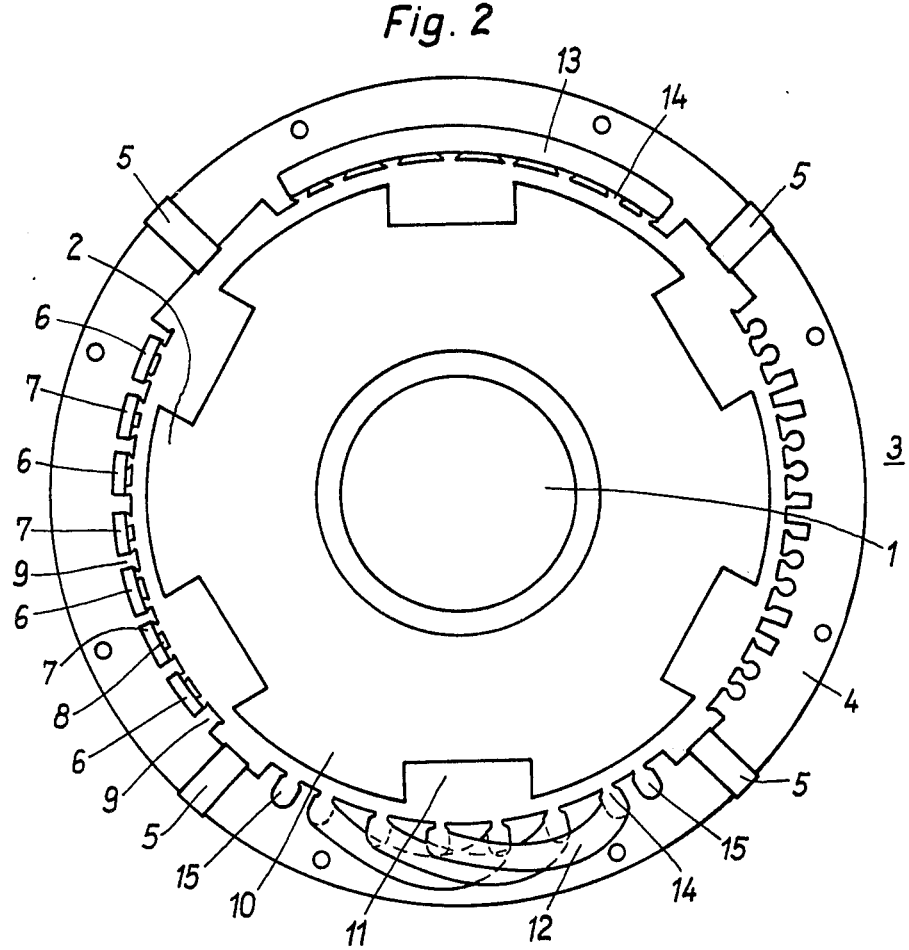
FIG. 2 illustrates an alternate embodiment of the composite machine arrangement according to the invention wherein the stator thereof is apportioned into four sections.

Referring now to the embodiment of the invention shown in FIG. 2, the stator 4 is different from the stator shown for the embodiment of FIG. 1. In FIG. 2, the stator 4 is partitioned into four approximately equal sections. The same reference symbols have been retained for the same parts. The primary windings 6 and secondary windings 7 of the inductive pulse generator are now situated on mutually opposite sections of the stator 4 and are so aligned with respect to their spatial relationship that, in the same way, three pulses displaced relative to each other by 120 electrical degrees can be formed from two secondary-winding voltages electrically displaced relative to each other by 180°. Teeth 9 without windings are always interposed between the primary windings 6 and the secondary windings 7.

In the other two mutually opposite lying sections, the alternating-current winding 12 of the tachometer is located in the slots 14 while the excitation winding 15 is always arranged in the outer slots 13. The two alternating-current windings 12 of the tachometer generator are electrically connected in series. Thereby, possible eccentricities of the toothed rotor 2 are equalized, so that the generated tachometer voltage indicates the instantaneous speed of the rotor 2 without error.

To prevent the high-frequency alternating-current fed to the primary windings 6 of the inductive pulse generator from exerting any influence on the tachometer voltage generated in the three-phase windings of the tachometer generator, damper windings 5 are arranged between each of the individual sections of the stator 4. The damper windings 5 consist of short-circuited turns around the laminated stack of the stator 4.

As the above-described embodiments of the invention show, the pulse generator for generating the control signals for the thyristors and the tachometer generator for providing an electrical quantity indicative of speed are configured, due to the combined type of construction, in the simplest manner, so that they can be used without difficulty inside the converter machine. The axial length of the machine is thereby hardly increased, if the stator of the composite machine is mounted at the stator or at the bearing plate of the converter machine. Pulse generators of the kind suitable for the composite machine according to the invention are also described in the co-pending application entitled: Inductive Control Pulse Generating Apparatus for an Electric Machine, Ser. No. 352,203, filed Apr. 18, 1973.

What is claimed is:

1. A composite machine for supplying speed and control signals to a speed-controllable converter machine assembly equipped with thyristors, the composite machine comprising: a slotted stator sub-divided into at least two sections along its circumference; an inductive pulse generator including primary and secondary windings arranged in one of said sections; tachometer means including excitation winding means and alternating-current winding means, both of said winding means of said tachometer means being disposed in the other one of said sections; a toothed rotor connected to the shaft of the converter machine and rotatably mounted in said stator to coact with the windings of said pulse generator to generate control signals for the thyristors and to coact with the winding means of said tachometer means to provide an electrical quantity indicative of the rotational speed of the machine; and damper winding means mounted between said sections.

2. The composite machine of claim 1, each of said sections taking up approximately half the circumference of said stator.

3. The composite machine of claim 1, said stator being sub-divided into four sections along its circumference of approximately the same size, each two mutually opposite lying sections constituting a pair of sections and being provided with the same windings.

4. The composite machine of claim 3, one of said pairs of sections corresponding to said tachometer means, said alternating-current winding means including an alternating-current winding in each section of said last-mentioned pair of sections, the alternating-current windings of said tachometer means being connected in series.

5. The composite machine of claim 1 wherein the converter machine assembly has a stationary member, said stator being fixedly mounted to said member.

* * * * *

UNITED STATES PATENT AND TRADEMARK OFFICE
CERTIFICATE OF CORRECTION

PATENT NO. : 3 902 086
DATED : August 26, 1975
INVENTOR(S) : Ulrich Schüler

It is certified that error appears in the above-identified patent and that said Letters Patent are hereby corrected as shown below:

in column 3, line 20, change "relative and modulated" to --relative the modulated--

Signed and Sealed this

*thirtieth* Day of *December 1975*

[SEAL]

Attest:

RUTH C. MASON
*Attesting Officer*

C. MARSHALL DANN
*Commissioner of Patents and Trademarks*